US012738780B2

(12) United States Patent
Goto et al.

(10) Patent No.: US 12,738,780 B2
(45) Date of Patent: Sep. 15, 2026

(54) ROTATING ELECTRIC MACHINE

(71) Applicant: Hitachi Astemo, Ltd., Hitachinaka (JP)

(72) Inventors: Hideaki Goto, Hitachinaka (JP); Takaki Itaya, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 291 days.

(21) Appl. No.: 18/707,427

(22) PCT Filed: Nov. 8, 2021

(86) PCT No.: PCT/JP2021/040910
§ 371 (c)(1),
(2) Date: May 3, 2024

(87) PCT Pub. No.: WO2023/079719
PCT Pub. Date: May 11, 2023

(65) Prior Publication Data
US 2026/0155686 A1 Jun. 4, 2026

(51) Int. Cl.
*H02K 1/20* (2006.01)
*H02K 1/276* (2022.01)
*H02K 5/20* (2006.01)

(52) U.S. Cl.
CPC ............... *H02K 1/20* (2013.01); *H02K 1/276* (2013.01); *H02K 5/20* (2013.01)

(58) Field of Classification Search
CPC ............. H02K 1/20; H02K 1/276; H02K 5/20
(Continued)

(56) References Cited

U.S. PATENT DOCUMENTS

2003/0206815 A1* 11/2003 Iritani ..................... F04B 35/04 417/366
2023/0336040 A1* 10/2023 Goto ...................... H02K 1/276
(Continued)

FOREIGN PATENT DOCUMENTS

JP 2003-324900 A 11/2003
JP 2013-223277 A 10/2013
WO WO-2021199172 A1 * 10/2021 ............... H02K 5/20

OTHER PUBLICATIONS

International Search Report Issued in PCT Application No. PCT/JP2021/040910 dated Dec. 7, 2021, with English translation.

*Primary Examiner* — Ahmed Elnakib
(74) *Attorney, Agent, or Firm* — Foley & Lardner LLP

(57) ABSTRACT

An object of the present invention is to provide a rotating electric machine that is capable of suppressing an increase in the pressure loss of refrigerant flowing through a cooling channel. A refrigerant channel in a stator 3 of the rotating electric machine 1 according to the present invention has: a first refrigerant channel 11 through which refrigerant flows in the circumferential direction; second refrigerant channels 12A, 12B through which the refrigerant flows in the axial direction; third refrigerant channels 13A, 13B through which the refrigerant flows in the circumferential direction; and a refrigerant supply channel 10. The refrigerant supply channel 10 first supplies the refrigerant to the first refrigerant channel 11. The first refrigerant channel 11, the second refrigerant channel 12, and the third refrigerant channel 13 are configured so that the refrigerant supplied to the first refrigerant channel 11 flows from one second refrigerant channel 12A to one third refrigerant channel 13A, and the refrigerant supplied to the first refrigerant channel 11 flows from the other second refrigerant channel 12B to the other third refrigerant channel 13B.

10 Claims, 7 Drawing Sheets

(58) Field of Classification Search
USPC ........................................................ 310/59
See application file for complete search history.

(56) References Cited

U.S. PATENT DOCUMENTS

| | | | | |
|---|---|---|---|---|
| 2024/0128828 | A1* | 4/2024 | Suzuki | H02K 5/203 |
| 2024/0162765 | A1* | 5/2024 | Tsuchiya | H02K 21/24 |

* cited by examiner

ROTATING ELECTRIC MACHINE

TECHNICAL FIELD

The present invention relates to a rotating electric machine equipped with a cooling structure.

BACKGROUND ART

Patent Literature 1 discloses an electric motor with a stator pressure-molded by sealing, inside a powder magnetic core material, a channel model of the same shape as a cooling channel made of brazing, low-melting-point alloy, or the like (see abstract). Paragraph 0024 and FIG. 5 of Patent Literature 1 describe a cascade channel model used to form a cooling channel. The channel model is formed by connecting three ring-shaped channel models, a plurality of axial channel models, an injection channel model, and a discharge channel model to each other, resulting in a stator equipped with a cooling channel of cascade shape.

CITATION LIST

Patent Literature

Patent Literature 1: Japanese Unexamined Patent Application Publication No. 2013-223277

SUMMARY OF INVENTION

Technical Problem

The stator in Patent Literature 1 is configured to includes three ring-shaped cooling channels through which refrigerant is made to flow in the circumferential direction of the stator, a plurality of axial cooling channels through which the refrigerant is made to flow in the axial direction of the stator, and an injection channel and a discharge channel. The three ring-shaped cooling channels are aligned in the axial direction. An injection channel is connected to one (injection-side ring-shaped cooling channel) of the two ring-shaped cooling channels arranged at both ends in the axial direction, and a discharge channel is connected to the other ring-shaped cooling channel (discharge-side ring-shaped cooling channel). Therefore, the refrigerant flowing from the injection channel into the injection-side ring-shaped cooling channel flows through the plurality of axial cooling channels to the ring-shaped cooling channel (intermediate ring-shaped cooling channel) disposed in the intermediate portion between the injection-side ring-shaped cooling channel and the discharge-side ring-shaped cooling channel. Then the refrigerant flows through the plurality of axial cooling channels to the discharge-side ring-shaped cooling channel. That is, the cooling channel in Patent Literature 1 is configured by the injection-side ring-shaped cooling channel, the intermediate ring-shaped cooling channel, and the discharge-side ring-shaped cooling channel being connected in series.

In the case of the cooling channel in Patent Literature 1, the three ring-shaped cooling channels are connected in series, resulting in an increase in the pressure loss of the refrigerant flowing through the cooling channels.

An object of the present invention is to provide a rotating electric machine that is capable of suppressing an increase in the pressure loss of refrigerant flowing through a cooling channel.

Solution to Problem

In order to achieve the above object, a rotating electric machine of the present invention includes: a stator having an annular stator core and a coil wound around the stator core; a rotor that is disposed on an inner peripheral side of the stator and that includes a rotary shaft, a rotor core to which the rotary shaft is fixed, and a magnet fixed to the rotor core; and a refrigerant channel through which refrigerant for cooling the stator flows. In the rotating electric machine, the refrigerant channel has: a first refrigerant channel through which the refrigerant flows along a circumferential direction surrounding the rotary shaft; a second refrigerant channel which communicates with the first refrigerant channel, and through which the refrigerant flows along an axial direction of the rotary shaft; a third refrigerant channel which communicates with the second refrigerant channel, and through which the refrigerant flows along the circumferential direction surrounding the rotary shaft; and a refrigerant supply channel that supplies the refrigerant first to the first refrigerant channel among the first refrigerant channel, the second refrigerant channel, and the third refrigerant channel, the third refrigerant channels are provided at both ends of the stator core in the axial direction, the first refrigerant channel is provided between the two third refrigerant channels respectively provided at both ends of the stator core in the axial direction, the second refrigerant channel has one second refrigerant channel that has one end communicating with the first refrigerant channel and the other end communicating with one of the two third refrigerant channels, and the other second refrigerant channel that has one end communicating with the first refrigerant channel and the other end communicating with the other of the two third refrigerant channels, and the first refrigerant channel, the second refrigerant channel, and the third refrigerant channel are configured so that the refrigerant supplied to the first refrigerant channel flows from the one second refrigerant channel to the one third refrigerant channel, and the refrigerant supplied to the first refrigerant channel flows from the other second refrigerant channel to the other third refrigerant channel.

Advantageous Effects of Invention

According to the present invention, it is possible to provide a rotating electric machine that is capable of suppressing an increase in the pressure loss of refrigerant flowing through a cooling channel.

Objects, configurations, and effects other than the above will be apparent from the description of the following embodiments.

DESCRIPTION OF EMBODIMENTS

Embodiments of the invention will now be described with reference to the drawings. Note that in the following description, the direction along a central axis 1*x* of a rotary shaft 5 of a rotating electric machine 1 will be referred to as the axial direction. Note that in the present embodiment, the central axis 1*x* of the rotary shaft 5 coincides with both the central axis of a stator 3 and the central axis of a rotor 4, and the axial direction 1*x* is synonymous with the direction along the central axis of the stator 3 and the direction along the central axis of the rotor 4.

Figure 1:
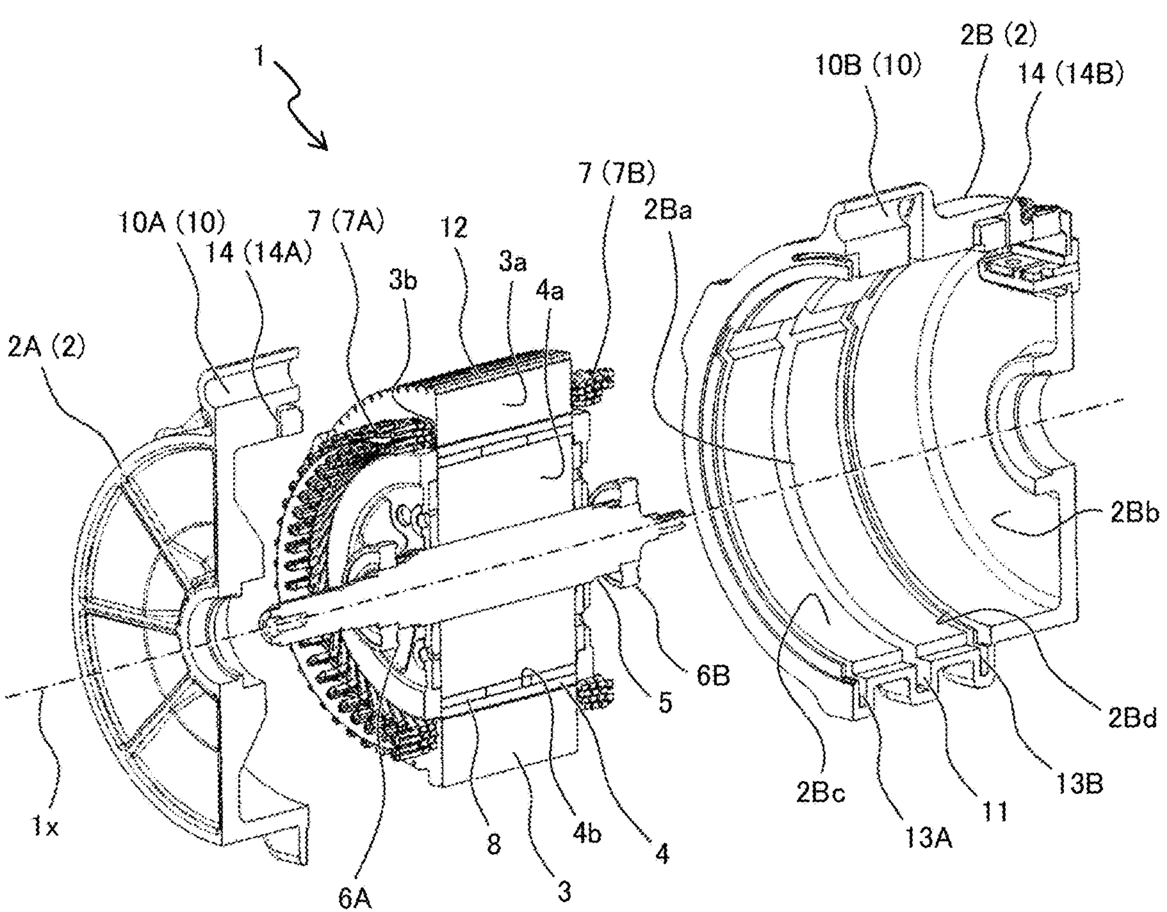
FIG. 1 is an exploded perspective view of a rotating electric machine according to an embodiment of the present invention, illustrating a cross-section taken along its central axis.

FIG. 1 is an exploded perspective view of the rotating electric machine according to an embodiment of the present invention, illustrating a cross-section taken along its central axis.

In the rotating electric machine 1, the stator 3 and the rotor 4 are housed in a housing 2 (2A, 2B). The housing 2 is comprised of a first housing 2A and a second housing 2B. The second housing 2B is formed in a bottomed cylindrical shape having an opening 2Ba at one end in the direction along the central axis 1*x* and a bottom 2Bb at the other end, and has a cylindrical portion 2Bc between the opening 2Ba side and the bottom 2Bb side. The first housing 2A is assembled to the opening 2Ba side of the second housing 2B, which houses the stator 3 and the rotor 4, and closes the opening 2Ba of the second housing 2B.

The stator 3 has a stator core 3*a* forming a cylindrical shape (annular shape) and a coil 7 wound around the stator core 3*a*. The stator core 3*a* is fitted to the inner peripheral side of the cylindrical portion 2Bc of the second housing 2B. The stator core 3*a* has a plurality of slots 3*b* on the inner peripheral side, and the coil 7 is wound around the slots 3*b*.

The stator 3 is inserted into the second housing 2B until the stator 3 abuts against a stepped portion 2Bd that is formed on the inner peripheral surface of the cylindrical portion 2Bc of the second housing 2B. The first housing 2A is also provided with a stepped portion (not illustrated) similar to the stepped portion 2Bd of the second housing 2B, and the stator 3 is held between the stepped portion of the first housing 2A and the stepped portion 2Bd of the second housing 2B when the first housing 2A is assembled to the second housing 2B.

The rotor 4 has the rotary shaft 5, a rotor core 4*a* to which the rotary shaft is fixed, and a magnet (permanent magnet) 8 fixed to the rotor core 4*a*. The rotor 4 is disposed on the inner peripheral side of the stator 3 so that its outer peripheral surface faces the inner peripheral surface of the stator 3. The rotor 4 according to the present embodiment is an embedded magnet rotor with the magnet 8 embedded in a hole 4*b* in a direction along the central axis 1*x* provided in the rotor core 4*a*.

The rotary shaft 5 provided in the rotor 4 is journaled in the housing 2 by two bearings 6A and 6B. The bearing 6A is attached to the first housing 2A, and the bearing 6B is attached to the second housing 2B. The rotary shaft 5 protrudes long from the first housing 2A side to the outside of the housing 2, and the output of the rotating electric machine 1 is taken out from the protruding portion of the rotary shaft 5.

The first housing 2A is provided on the side from which the output of the rotating electric machine 1 is taken out and may be referred to as a front housing. Furthermore, the second housing 2B may be referred to as a rear housing in contrast to the front housing 2A. The rotating electric machine 1 will be described with the side where the front housing 2A is provided as the front side and the bottom 2Bb side of the second housing 2B as the rear side in the axial direction 1*x*.

With the recent trend toward higher power density in rotating electric machines, higher loss density is being developed. In particular, the coil end of the stator has a problem of temperature rise due to increased loss accompanied with increased current, and it is thus necessary to establish an efficient cooling method. In oil-cooling structures, the coil end is cooled by directly dripping or spraying refrigerant. At this time, since the temperature of the coil end depends on the amount of refrigerant supplied, it is necessary to supply a larger amount of refrigerant in order to efficiently cool the coil end. The amount of refrigerant supplied depends on the geometric structure of a refrigerant channel (cooling channel) that supplies the refrigerant to the coil end and the flow pressure loss of the refrigerant channel (cooling channel) that supplies the refrigerant to the coil end. Therefore, in order to increase the amount of refrigerant supplied, it is necessary to optimize the geometrical structure of the cooling channel and to reduce the pressure loss in the cooling channel.

Figure 2A:
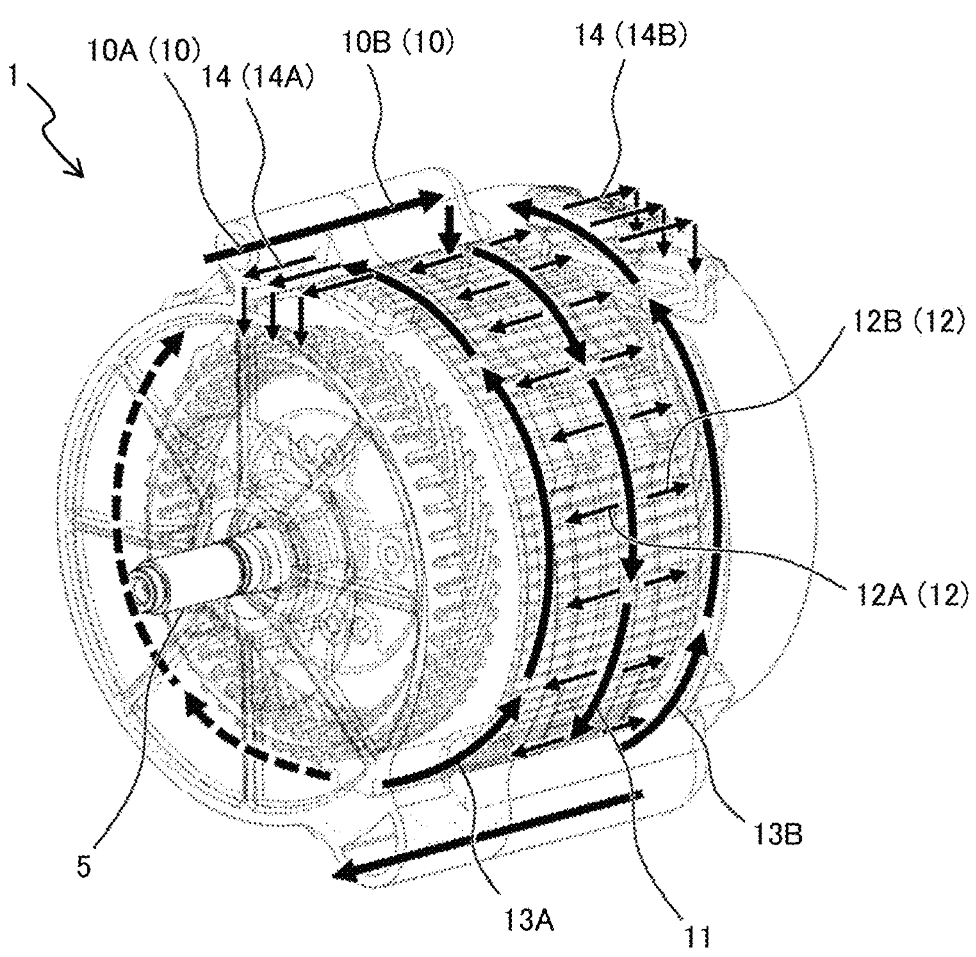
FIG. 2A is a conceptual diagram schematically illustrating cooling channels for the rotating electric machine according to the embodiment of the present invention.
Figure 2B:
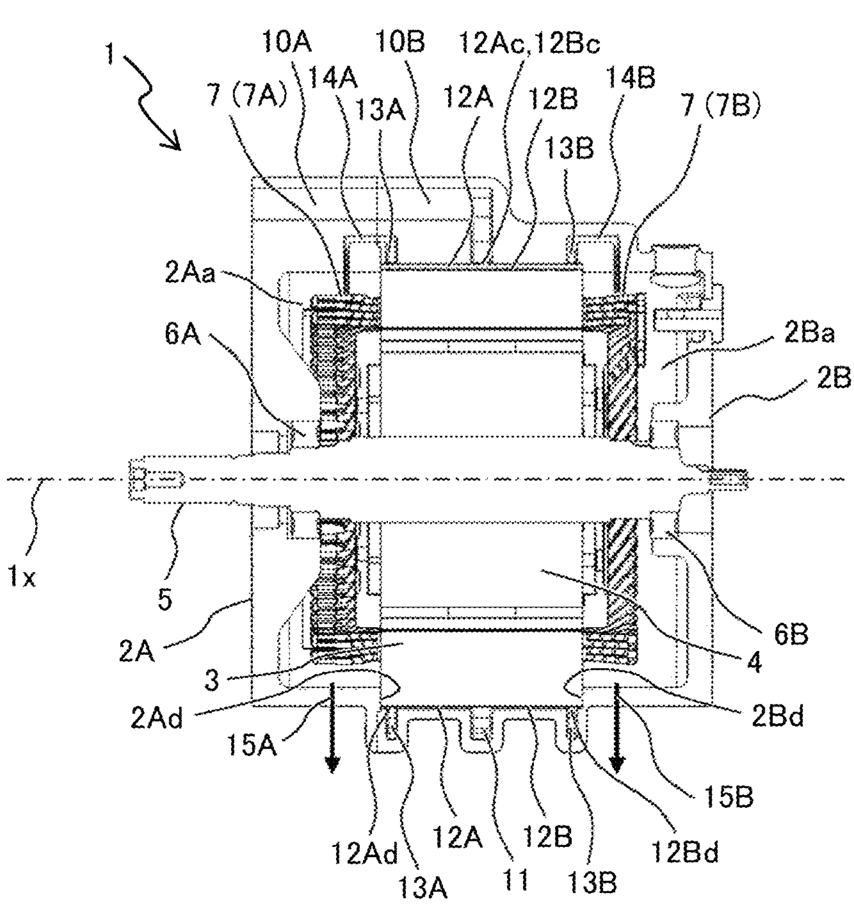
FIG. 2B is a cross-sectional view of the rotating electric machine according to the embodiment of the present invention taken along the central axis.

The cooling channels of the rotating electric machine 1 according to the present embodiment will be described with reference to FIGS. 2A and 2B. FIG. 2A is a conceptual diagram schematically illustrating cooling channels 10, 11, and 12 for the rotating electric machine 1 according to the embodiment of the present invention. FIG. 2B is a cross-sectional view of the rotating electric machine 1 according to the embodiment of the present invention taken along the central axis 1*x*. Note that the arrows shown in solid or dashed lines in the drawings indicate the flow of the refrigerant, and also indicate the cooling channels through which the refrigerant flows.

The rotating electric machine 1 according to the present embodiment includes: the stator 3 having the annular stator core 3*a* and the coil 7 wound around the stator core 3*a*; the rotor 4 that is disposed on the inner peripheral side of the stator 3 and includes the rotary shaft 5, the rotor core 4*a* to which the rotary shaft 5 is fixed, and the magnet 8 fixed to the rotor core 4*a*; and a refrigerant channel through which refrigerant for cooling the stator flows.

The refrigerant channel has a first refrigerant channel 11, a second refrigerant channel 12, a third refrigerant channel 13, and a refrigerant supply channel 10 (10A, 10B). The first refrigerant channel 11 is configured so that, in the first refrigerant channel 11, the refrigerant flows along the circumferential direction surrounding the rotary shaft 5. The second refrigerant channel 12 communicates with the first refrigerant channel 11 and is configured so that, in the second refrigerant channel 12, the refrigerant flows along the axial direction of the rotary shaft 5. The third refrigerant channel 13 communicates with the second refrigerant channel 12 and is configured so that, in the third refrigerant channel 13, the refrigerant flows along the circumferential direction surrounding the rotary shaft 5. The refrigerant supply channel 10 (10A, 10B) supplies first the refrigerant to the first refrigerant channel 11 among the first refrigerant channel 11, the second refrigerant channel 12, and the third refrigerant channel 13.

Note that the refrigerant supply channel 10A is configured in housing 2A, and the refrigerant supply channel 10B is configured in housing 2B. By assembling the housing 2A and the housing 2B, the refrigerant supply channel 10A and the refrigerant supply channel 10B are combined to form a single refrigerant supply channel.

In the present embodiment, the third refrigerant channels 13 (13A, 13B) are provided at both ends of the stator core [3] 3*a* in the axial direction 1*x* (see FIG. 1). In this case, the third refrigerant channels 13 include a single refrigerant channel 13A disposed on the front side (front housing 2A side) with respect to the first refrigerant channel 11 and a single refrigerant channel 13B disposed on the rear side (bottom 2Bb side of the rear housing 2B) with respect to the first refrigerant channel 11.

The first refrigerant channel 11 is a single refrigerant channel disposed at the center of the stator core 3*a* in the axial direction. The first refrigerant channel 11 is provided between the two third refrigerant channels 13A and 13B provided at both ends of the stator core 3*a* in the axial direction 1*x*.

Note that the first refrigerant channel 11 is not limited to one. Also note that the number of the third refrigerant channels 13 is not limited to two. However, the configuration in which the two third refrigerant channels 13A and 13B are arranged for the single first refrigerant channel 11 allows a refrigerant channel with improved cooling effect to be achieved with a simple configuration.

The second refrigerant channel 12 includes: a second refrigerant channel 12A disposed between the first refrigerant channel 11 and the front third refrigerant channel 13A; and a second refrigerant channel 12B disposed between the first refrigerant channel 11 and the rear third refrigerant channel 13B.

The second refrigerant channel 12A is disposed on the front side relative to the first refrigerant channel 11, and has one end connected to the first refrigerant channel 11 and the other end connected to the front third refrigerant channel 13A. As a result, the second refrigerant channel 12A is configured so that the refrigerant supplied to the first refrigerant channel 11 flows through the second refrigerant channel 12A to the third refrigerant channel 13A.

The second refrigerant channel 12B is disposed on the rear side relative to the first refrigerant channel 11, and has one end connected to the first refrigerant channel 11 and the other end connected to the rear third refrigerant channel 13B. As a result, the second refrigerant channel 12B is configured so that the refrigerant supplied to the first refrigerant channel 11 flows through the second refrigerant channel 12B to the third refrigerant channel 13B.

As described above, the rotating electric machine 1 according to the present embodiment includes: the stator 3 having the annular stator core 3*a* and the coil 7 wound around the stator core 3*a*; the rotor 4 that is disposed on the inner peripheral side of the stator 3 and includes the rotary shaft 5, the rotor core 4*a* to which the rotary shaft 5 is fixed, and the magnet 8 fixed to the rotor core 4*a*; and the refrigerant channel through which the refrigerant for cooling the stator 3 flows. The refrigerant channel has: the first refrigerant channel 11 through which the refrigerant flows along the circumferential direction surrounding the rotary shaft 5; the second refrigerant channel 12 which communicates with the first refrigerant channel 11, and through which the refrigerant flows along the axial direction of the rotary shaft 5; the third refrigerant channel 13 which communicates with the second refrigerant channel 12, and through which the refrigerant flows along the circumferential direction surrounding the rotary shaft 5; and the refrigerant supply channel 10 (10A, 10B) that supplies the refrigerant to the first refrigerant channel 11 first among the first refrigerant channel 11, the second refrigerant channel 12, and the third refrigerant channel 13. The third refrigerant channels 13 (13A, 13B) are provided at both ends of the stator core 3*a* in the axial direction 1*x* (see FIG. 1).

The first refrigerant channel 11 is provided between the two third refrigerant channels 13A and 13B provided at both ends of the stator core 3*a* in the axial direction 1*x*.

The second refrigerant channel 12 has one second refrigerant channel 12A that has one end communicating with the first refrigerant channel 11 and the other end communicating with one 13A of the two third refrigerant channels 13A and 13B, and the other second refrigerant channel 12B that has one end communicating with the first refrigerant channel 11 and the other end communicating with the other third refrigerant channel 13B of the two third refrigerant channels 13A and 13B.

The first refrigerant channel 11, the second refrigerant channel 12, and the third refrigerant channel 13 are configured so that the refrigerant supplied to the first refrigerant channel 11 flows from the one second refrigerant channel 12A to the one third refrigerant channel 13A, and the refrigerant supplied to the first refrigerant channel 11 flows from the other second refrigerant channel 12B to the other third refrigerant channel 13B.

In this case, a plurality of the second refrigerant channels (one second refrigerant channels) 12A and a plurality of the second refrigerant channels (the other second refrigerant channels) 12B are provided circumferentially on the outer peripheral surface of the stator core 3*a*.

The rotating electric machine 1 according to the present embodiment also has a communication path 14 as a refrigerant channel. The communication path 14 includes a communication path 14A and a communication path 14B. The communication path 14A communicates the third refrigerant channel 13A with an internal space 2Aa of the housing 2A. A coil end portion 7A configured on one end face side of the stator core 3*a* is disposed in the internal space 2Aa of the housing 2A. The communication path 14B communicates the third refrigerant channel 13B with an internal space 2Ba of the housing 2B. A coil end portion 7B configured on the other end face side of the stator core 3*a* is disposed in the internal space 2Ba of the housing 2B.

The communication path 14A is formed across the housing 2A and the housing 2B, and is mostly formed in the housing 2A. The communication path 14B is formed in the housing 2B. The communication path 14A and the communication path 14B are provided above an uppermost portion of the coil end portions 7 (7A, 7B).

The communication path 14A drips the refrigerant onto the coil end portion 7A from an outlet located above the coil end portion 7A. The communication path 14B drips the refrigerant onto the coil end portion 7B from an outlet located above the coil end portion 7B.

The communication paths 14A and 14B constitute a refrigerant drip channel (refrigerant drip portion) that drips the refrigerant onto the coil end portions 7 (7A, 7B).

That is, the rotating electric machine 1 according to the present embodiment has: one communication path 14A that has one end communicating with the one third refrigerant channel 13A and the other end communicating with the internal space 2Aa of the housing 2 (2A) in which the coil end portion 7A configured on one end face side of the stator core 3*a* is disposed; and the other communication path 14B that has one end communicating with the other third refrigerant channel 13B and the other end communicating with the internal space 2Ba of the housing 2 (2B) in which the coil end portion 7B configured on the other end face side of the stator core 3*a* is disposed. The one communication path 14A and the other communication path 14B are provided above the uppermost portion of the coil end portions 7 (7A, 7B).

In the rotating electric machine 1 according to the present embodiment, as illustrated in FIGS. 2A and 2B, the refrigerant supplied to the first refrigerant channel 11 is divided into the plurality of one second refrigerant channels 12A and the plurality of other second refrigerant channels 12B while flowing circumferentially in contact with the outer peripheral surface of the stator core 3*a*. The refrigerant divided into the plurality of one second refrigerant channels 12A flows upward in the one third refrigerant channel 13A while merging in the one third refrigerant channel 13A, and reaches the one communication path 14A. The refrigerant divided into the plurality of other second refrigerant channels 12B flows upward in the other third refrigerant channel 13B while merging in the other third refrigerant channel 13B, and reaches the other communication path 14B.

The rotating electric machine 1 according to the present embodiment also has a first refrigerant discharge channel 15A and a second refrigerant discharge channel 15B as refrigerant channels. The first refrigerant discharge channel 15A is provided in the housing (first housing) 2A, and constitutes a refrigerant discharge channel that communicates the internal space 2Aa of the housing 2A with the outside of the housing 2A. The second refrigerant discharge channel 15B is provided in the housing (second housing) 2B, and constitutes a refrigerant discharge channel that communicates the internal space 2Ba of the housing 2B with the outside of the housing 2B. In order to discharge the refrigerant, the first refrigerant discharge channel 15A and the second refrigerant discharge channel 15B are provided at the lower portion of the housing 2 (2A, 2B).

That is, in the rotating electric machine 1 according to the present embodiment, the first housing 2A has the first refrigerant discharge channel 15A that discharges to the outside of the first housing 2A, the refrigerant dripped onto the coil end portion 7A on the one end face side of the stator core 3*a*. The second housing 2B has the second refrigerant discharge channel 15B that discharges to the outside of the second housing 2B, the refrigerant dripped onto the coil end portion 7B on the other end face side of the stator core 3*a*.

Figure 3:
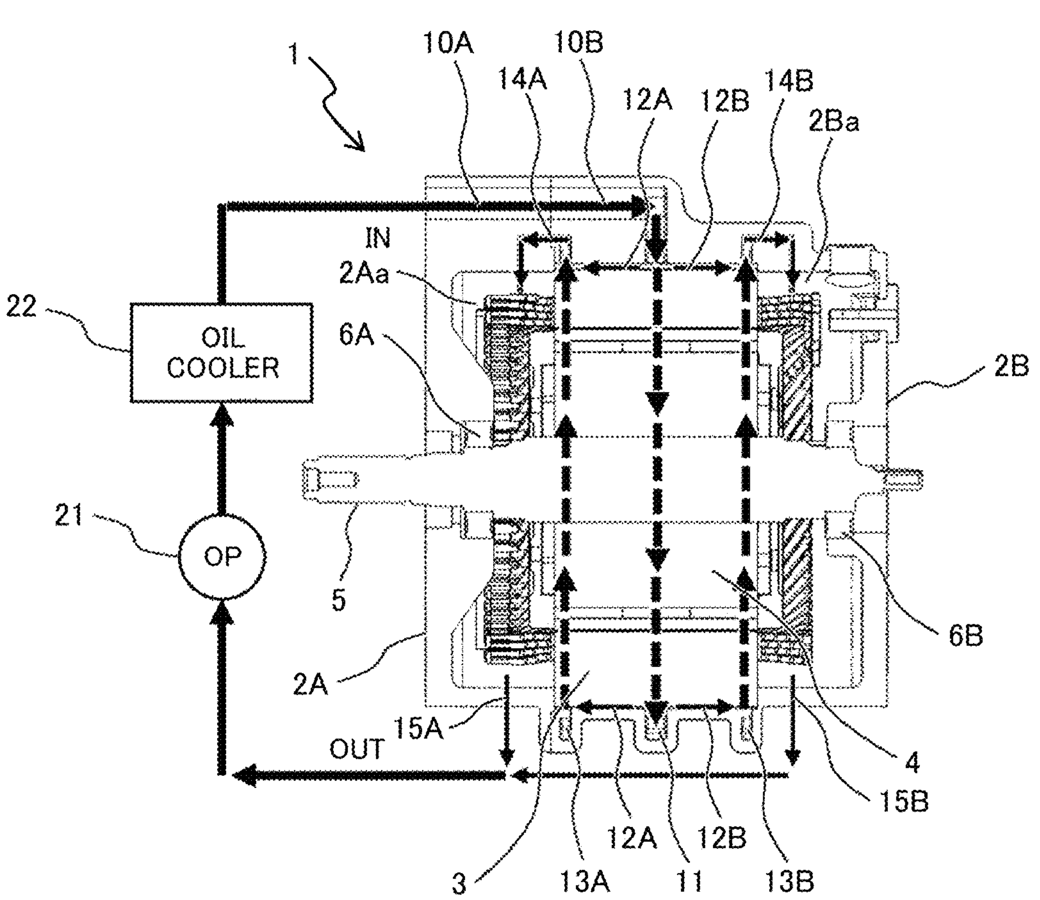
FIG. 3 is a configuration diagram of a cooling system using the rotating electric machine according to the embodiment of the present invention.

Next, a cooling system according to the present embodiment will be explained with reference to FIG. 3. FIG. 3 is a configuration diagram of a cooling system using the rotating electric machine according to the embodiment of the present invention.

In the present embodiment, the refrigerant is pumped by an oil pump 21 to the rotating electric machine 1 through the refrigerant channel. A cooling unit 22 is provided in the refrigerant channel, and the refrigerant pumped by the oil pump 21 is cooled by the cooling unit 22. The refrigerant cooled by the cooling unit 22 is sent from the refrigerant supply channel 10 to the first refrigerant channel 11.

The refrigerant flows around the entire circumference of the stator core 3*a* through the first refrigerant channel 11 disposed in the axial center of the stator core 3*a*, and then flows from the first refrigerant channel 11 to the end in the axial direction of the stator core 3*a* through the second refrigerant channels 12. The third refrigerant channel 13 disposed at the end in the axial direction of the stator core 3*a* guides the refrigerant flowing axially from the plurality of second refrigerant channels 12 to the circumferential upper side while merging the refrigerant.

In the present embodiment, the refrigerant supplied from the refrigerant supply channel 10 is widely diffused throughout the stator core 3*a* by the first refrigerant channel 11 and the second refrigerant channels 12. The refrigerant that has cooled the stator 3 by flowing through the plurality of second refrigerant channels 12 is collected at the upper part of the stator 3 by the third refrigerant channel 13 and supplied to the coil end portions 7 (7A, 7B) from above the coil end portions 7 (7A, 7B). In this case, the refrigerant dispersed in the plurality of second refrigerant channels 12 is recovered by the third refrigerant channel 13 and supplied to the coil end portions 7 (7A, 7B). This configuration of the refrigerant channel increases the flow rate of the refrigerant supplied to the coil end portions 7 (7A, 7B) and improves the cooling performance of the coils.

Furthermore, the third refrigerant channels 13A and 13B located at both ends of the stator core 3*a* are connected in parallel with the first refrigerant channel 11, thereby allowing a reduction in the pressure loss in the refrigerant channels and an increase in the flow rate of refrigerant reaching the upper portion of the coil end portions 7A, 7B. In addition, the reduced pressure loss in the refrigerant channels allows even a pump (small pump) with low discharge capacity to provide a sufficient flow rate.

The refrigerant supplied to the first refrigerant channel 11 disposed in the axial center of the stator core 3*a* flows toward the third refrigerant channels 13A and 13B provided at both ends of the stator core 3*a*. In this case, the temperature gradient in the axial direction can be reduced compared to the case where the refrigerant is supplied in one direction from one end of the stator core 3*a* to the other end.

Figure 4:
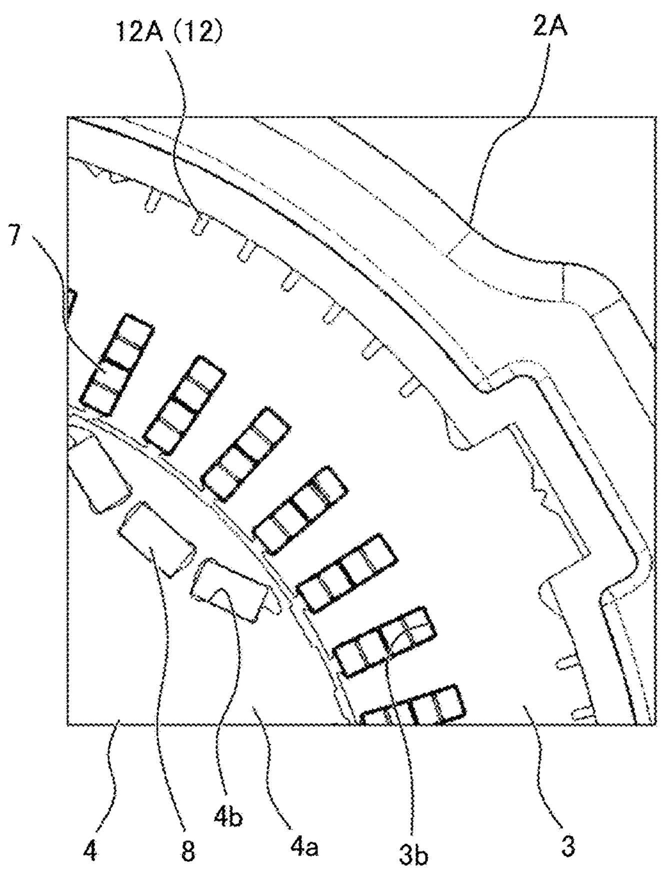
FIG. 4 is a partially enlarged sectional view of the rotating electric machine according to the embodiment of the present invention, illustrating a cross-section perpendicular to the central axis.
Figure 5:
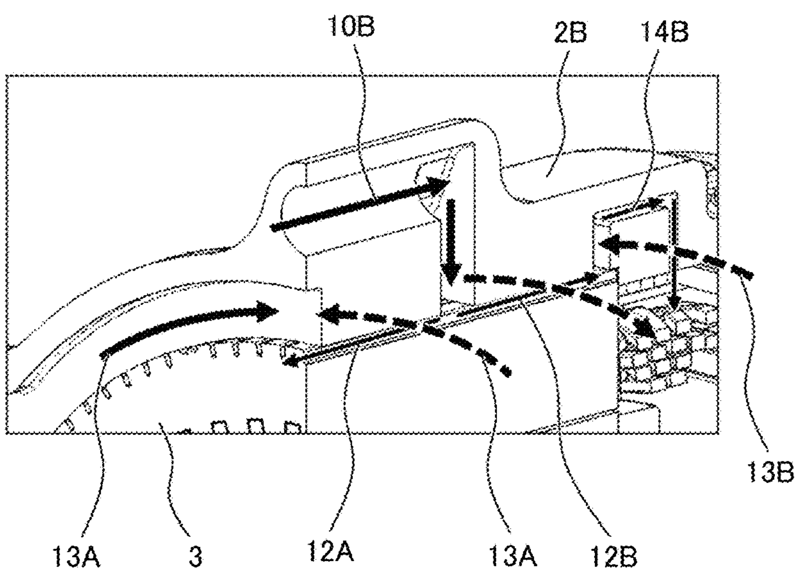
FIG. 5 is a partially enlarged sectional view of the rotating electric machine illustrated in FIG. 1, with a first housing removed.

Next, the configuration of the first refrigerant channel 11, the second refrigerant channel 12, and the third refrigerant channel 13 will be described in detail with reference to FIGS. 4 and 5, together with FIGS. 1 and 2B. FIG. 4 is a partially enlarged sectional view of the rotating electric machine according to the embodiment of the present invention, illustrating a cross-section perpendicular to the central axis. FIG. 5 is a partially enlarged sectional view of the rotating electric machine illustrated in FIG. 1, with the first housing removed.

The rotating electric machine 1 according to the present embodiment includes the housing 2 (2A, 2B) for the stator 3 and the rotor 4. At least one of the first refrigerant channel 11, the second refrigerant channel 12, or the third refrigerant channel 13 has a groove-shaped portion formed on the outer peripheral surface of the stator core 3*a*, and the groove-shaped portion is covered with the inner peripheral surface of the housing 2 (2B). The refrigerant channel with the groove-shaped portion formed on the outer peripheral surface of the stator core 3*a* can directly cool the stator core 3*a* by bringing the refrigerant into direct contact with the surface of the stator core 3*a*, and cooling efficiency is improved by increasing the contact area.

In the present embodiment, the second refrigerant channel 12 is constituted by the groove-shaped portion formed on the outer peripheral surface of the stator core 3*a*. That is, the second refrigerant channel 12 has the groove-shaped portion formed on the outer peripheral surface of the stator core 3*a*, and the groove-shaped portion is covered with the inner peripheral surface of the housing 2 (2B).

The second refrigerant channel 12A and the second refrigerant channel 12B are constituted by the groove-shaped portion formed on the outer peripheral surface of the stator core 3*a*. The groove-shaped portion forms a straight line along the axial direction 1*x*, and is continuously straight from the front end (one end) to the rear end (the other end) of the stator core 3*a*. That is, the groove-shaped portion of the second refrigerant channel (one second refrigerant channel) 12A and the groove-shaped portion of the second refrigerant channel (the other second refrigerant channel) 12B are a continuous straight groove-shaped portion.

Furthermore, the present embodiment has the following features due to the configuration of the second refrigerant channel 12 described above. That is, as shown in FIG. 2B, an inlet 12Ac of the one second refrigerant channel 12A communicating with the first refrigerant channel 11 and an inlet 12Bc of the other second refrigerant channel 12B communicating with the first refrigerant channel 11 open in the outer peripheral surface of the stator core 3*a* so as to face outward in the radial direction.

The stator core 3*a* according to the present embodiment is formed by laminating electromagnetic steel sheets. The groove-shaped portion of the stator core 3*a* is formed by recesses formed in the outer periphery of the laminated electromagnetic steel sheets, and the groove-shaped portion forming a straight line along the axial direction 1*x* can be constituted by the recesses formed at the same position in the outer periphery of the electromagnetic steel sheets. That is, in the present embodiment, the stator core 3*a* can be manufactured by pressing a number of electromagnetic steel sheets to be laminated into the same shape, thereby allowing an improvement in manufacturing efficiency.

Meanwhile, when forming a spiral refrigerant channel as a groove-shaped portion in a laminate of electromagnetic steel sheets, it is necessary to shift the position of the recesses formed in the outer periphery of the electromagnetic steel sheets, one by one, in the circumferential direction. That is, it is necessary to change the dies of press working for each of the many electromagnetic steel sheets that constitute one stator core 3*a*. For this reason, it is preferable to configure the spiral refrigerant channel on the housing 2 side. If the spiral refrigerant channel is formed as a hollow portion in the housing 2, the refrigerant is brought into contact with the stator core 3*a* indirectly with the housing 2 therebetween. As a result, the cooling performance is lowered compared to the case where the refrigerant is brought into direct contact with the stator core 3*a*. Alternatively, if the spiral refrigerant channel is formed in the shape of a groove on the inner peripheral surface of the housing 2, the refrigerant is simply in contact with the surface of the stator core 3*a*, and the contact area between the refrigerant and the stator core 3*a* becomes smaller. Therefore, in this case, the cooling performance is lower than the case where the refrigerant channel is formed as a groove-shaped portion on the outer peripheral surface of the stator core 3*a*.

In the present embodiment, the second refrigerant channel 12A and the second refrigerant channel 12B are formed as a groove-shaped portion on the outer peripheral surface of the stator core 3*a*, thereby allowing a larger contact area between the refrigerant and the stator core 3*a* and improved cooling performance.

As illustrated in FIGS. 2B and 5, the first refrigerant channel 11, the third refrigerant channel 13A, and the third refrigerant channel 13B have groove-shaped portions formed on the inner peripheral surface of the housing 2 (2B), and the groove-shaped portions is covered with the outer peripheral surface of the stator core 3*a*. These groove-shaped portions are formed as groove-shaped portions that are depressed radially outward from the inner peripheral surface of the housing 2 (2B). In this case, the outer peripheral surface of the stator core 3*a* which covers the groove-shaped portions of the housing 2 (2B) is the portion of the outer peripheral surface of the stator core 3*a* where the second refrigerant channel 12 is not formed.

In the housing 2 (2B), the groove-shaped portion of the second refrigerant channel 12, which faces the groove-shaped portion forming the first refrigerant channel 11, includes the inlet 12Ac of the second refrigerant channel 12A and the inlet 12Bc of the second refrigerant channel 12B. Thus, the first refrigerant channel 11 and the second refrigerant channel 12 communicate with each other.

In the housing 2 (2B), the groove-shaped portion of the second refrigerant channel 12A, which faces the groove-shaped portion forming the third refrigerant channel 13A, includes an outlet 12Ad of the second refrigerant channel 12A, and the third refrigerant channel 13A and the second refrigerant channel 12A communicate with each other. The groove-shaped portion of the second refrigerant channel 12B in housing 2 (2B), facing the groove-shaped portion forming the third refrigerant channel 13B, includes an outlet 12Bd of the second refrigerant channel 12B, and the third refrigerant channel 13B and the second refrigerant channel 12A communicate with each other.

That is, in the rotating electric machine 1 according to the present invention, the one third refrigerant channel 13A is provided axially inwardly from one end (front end) of the stator core 3*a* in the axial direction 1*x*, and the other third refrigerant channel 13B is provided axially inwardly from the other end (rear end) of the stator core 3*a* in the axial direction 1*x*. The first refrigerant channel 11, the one third refrigerant channel 13A, and the other third refrigerant channel 13B have the groove-shaped portions formed on the inner peripheral surface of the housing 2 (2B), and the groove-shaped portions are covered with the outer peripheral surface of the stator core 3*a*.

As illustrated in FIG. 2B, the first housing 2A has a stepped portion 2Ad perpendicular to the axial direction 1*x*. The stepped portion 2Ad faces and abuts on one end face of the stator core 3*a*. The second housing 2B has a stepped portion 2Bd perpendicular to the axial direction 1*x*. The stepped portion 2Bd faces and abuts on the other end face of stator core 3*a*.

The end of the groove-shaped portion constituting the second refrigerant channel 12A, which is on the opposite side of the first refrigerant channel 11 side is closed by the stepped portion 2Ad of the first housing 2A. That is, the downstream (outlet side) end of the groove-shaped portion of the second refrigerant channel 12A is closed by abutting of the stepped portion 2Ad of the first housing 2A against one end face (front end face) of the stator core 3*a*.

Meanwhile, the end of the groove-shaped portion constituting the second refrigerant channel 12B, which is on the opposite side of the first refrigerant channel 11 side is closed by the stepped portion 2Bd of the second housing 2B. That is, the downstream (outlet side) end of the groove-shaped portion of the second refrigerant channel 12B is closed by abutting of the stepped portion 2Bd of the second housing 2B against the other end face (front end face) of the stator core 3*a*.

That is, in the rotating electric machine 1 according to the present invention, the housing 2 has the first housing 2A disposed on the one end side of the stator core 3*a* in the axial direction 1*x* and the second housing 2B disposed on the other end side of the stator core 3*a*. The first housing 2A has the stepped portion 2Ad that abuts on one end face of the stator core 3*a*. The second housing 2B has the stepped portion 2Bd that abuts on the other end face of the stator core 3*a*. The end (front end) of the groove-shaped portion of the one second refrigerant channel 12A, which is on the opposite side of the first refrigerant channel 11 side is closed by the stepped portion 2Ad of the first housing 2A. The end (rear end) of the groove-shaped portion of the other second refrigerant channel 12B, which is on the opposite side of the first refrigerant channel 11 side is closed by the stepped portion 2Bd of the second housing 2B.

When compared in terms of the cross-sectional area of each of the refrigerant channel portions constituting the first refrigerant channel 11, the second refrigerant channel 12, and the third refrigerant channel 13, the cross-sectional area of the second refrigerant channel 12 is the smallest and the cross-sectional area of the first refrigerant channel 11 is the largest. The cross-sectional area of the third refrigerant channel 13 is larger than the cross-sectional area of the second refrigerant channel 12 and smaller than the cross-sectional area of the first refrigerant channel 11.

The first refrigerant channel 11, the second refrigerant channel 12, and the third refrigerant channel 13 have channel cross-sectional areas having the following relationship: cross-sectional area of single second refrigerant channel<cross-sectional area of single third refrigerant channel<cross-sectional area of single first refrigerant channel.

The first refrigerant channel 11 is a refrigerant channel to which the refrigerant is initially supplied, and has the largest cross-sectional area among the three refrigerant channels, in order to reduce the pressure loss in the first refrigerant channel. Furthermore, the third refrigerant channel 13 is comprised of the two refrigerant channels 13A and 13B, and the second refrigerant channel 12 is comprised of the refrigerant channels 12A and 12B, each of which is comprised of a plurality of refrigerant channels. The number of refrigerant channels (number of branches) constituting the first refrigerant channel 11, the second refrigerant channel 12, and the third refrigerant channel 13 is greatest in the second refrigerant channel 12 and least in the first refrigerant channel 11, and the third refrigerant channel 13 is less than the second refrigerant channel 12 and more than the first refrigerant channel 11. Even by the number of branches in the refrigerant channels, the cross-sectional areas of the first refrigerant channel 11, the second refrigerant channel 12, and the third refrigerant channel 13 are configured as described above, so that refrigerant flow stagnation in the intermediate portion of the refrigerant channels can be prevented.

A modification of the refrigerant supply channel 10 (10A, 10B) will be described with reference to FIGS. 6 to 8. The communication paths 14A and 14B must be located above the coil end portions 7 (7A, 7B) in order to allow the refrigerant to drip into the coil end portions 7 (7A, 7B). In contrast, the refrigerant supply channel 10 can be disposed in various ways to prevent interference with equipment in which the rotating electric machine 1 is mounted and to ensure the cross-section of the refrigerant supply channel 10.

Figure 6:
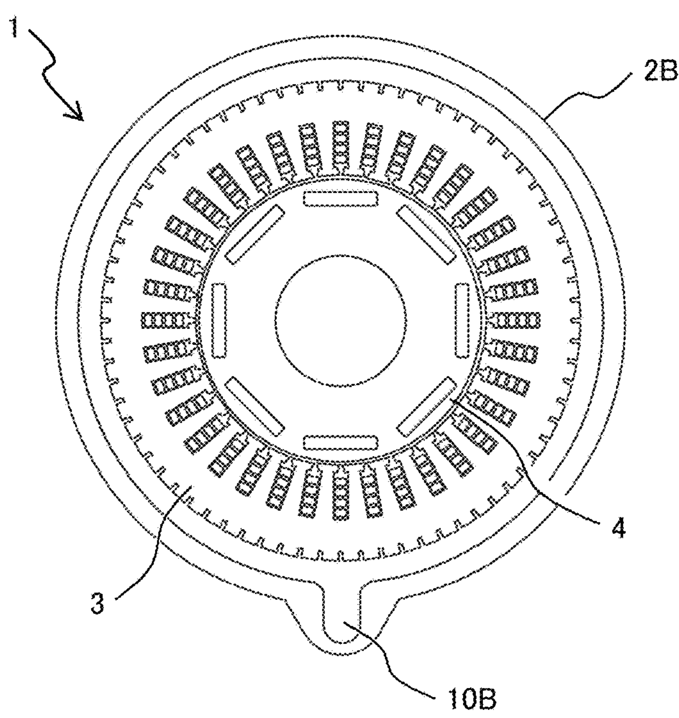
FIG. 6 is a schematic cross-sectional view of the rotating electric machine according to the present invention, illustrating an example in which a refrigerant supply channel is disposed at the lower portion.

FIG. 6 is a schematic cross-sectional view of the rotating electric machine 1 according to the present invention, illustrating an example in which the refrigerant supply channel 10 (10A, 10B) is disposed at the lower portion. In the embodiment described above, the refrigerant supply channel 10 (10A, 10B) is disposed at the upper portion of the rotating electric machine 1, with the communication paths 14A, 14B located above the coil end portions 7. In this example, the refrigerant supply channel 10 is disposed at the lower portion of the rotating electric machine 1. The refrigerant supply channel 10 may be disposed in this manner.

Figure 7:
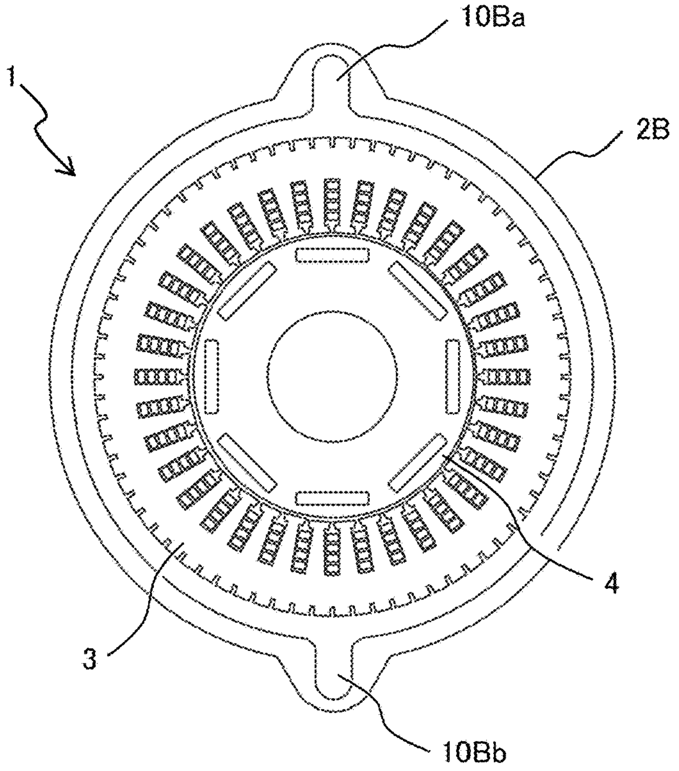
FIG. 7 is a schematic cross-sectional view of the rotating electric machine according to the present invention, illustrating an example in which the refrigerant supply channels are arranged at the upper and lower portions.

FIG. 7 is a schematic cross-sectional view of the rotating electric machine according to the present invention, illustrating an example in which the refrigerant supply channels 10 (10A, 10B) are arranged at the upper and lower portions. In this example, the refrigerant supply channels 10 are arranged both at the upper and lower portions of the rotating electric machine 1. The refrigerant supply channel 10 may be disposed in this manner.

Figure 8:
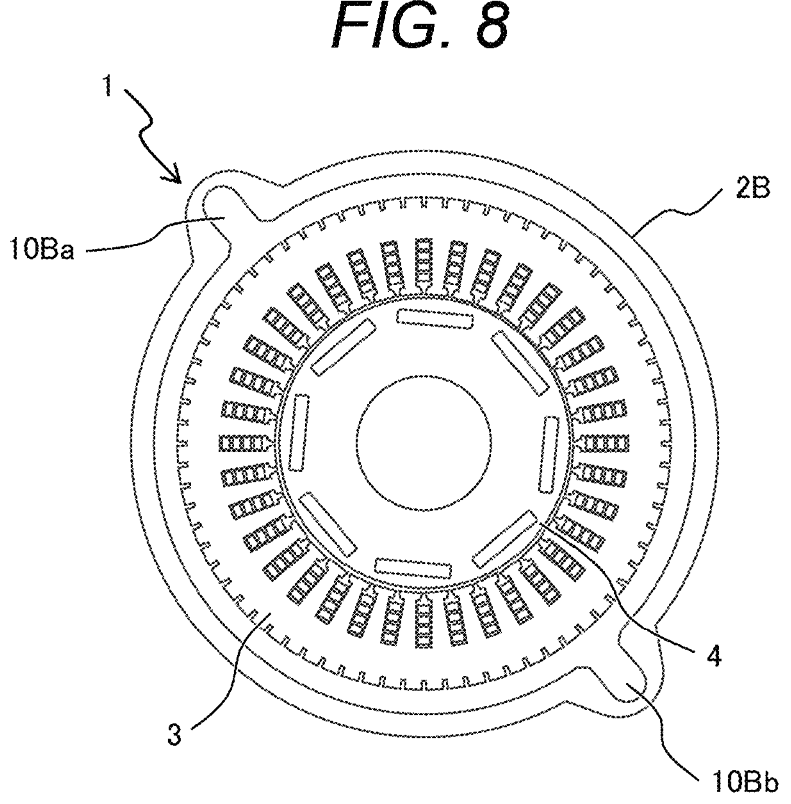
FIG. 8 is a schematic cross-sectional view of the rotating electric machine according to the present invention, illustrating an example in which the refrigerant supply channels are arranged diagonally.

FIG. 8 is a schematic cross-sectional view of the rotating electric machine according to the present invention, illustrating an example in which the refrigerant supply channels 10 (10A, 10B) are arranged diagonally. In this example, the refrigerant supply channels 10 are arranged at intermediate positions (diagonal position) between the upper portion or lower portion and horizontal section of the rotating electric machine 1. The refrigerant supply channel 10 may be disposed in this manner.

By disposing the refrigerant supply channel 10 as illustrated in FIGS. 6 through 8 or in even different positions, the mountability of the rotating electric machine 1 in other equipment is improved and the design flexibility is improved.

It should be noted that the present invention is not limited to the embodiments described above, and includes various modification examples. For example, the embodiments described above have been described in detail to simply describe the present invention, and are not necessarily required to include all the described configurations. In addition, part of the configuration of one embodiment can be replaced with the configurations of other embodiments, and in addition, the configuration of the one embodiment can also be added with the configurations of other embodiments. In addition, part of the configuration of each of the embodiments can be subjected to addition, deletion, and replacement with respect to other configurations.

REFERENCE SIGNS LIST

1 . . . rotating electric machine, 1*x* . . . axial direction, 2 . . . housing, 2A . . . first housing, 2Aa . . . internal space of first housing 2A, 12Ac . . . inlet of second refrigerant channel 12A, 2Ad . . . stepped portion of first housing 2A 2B . . . second housing, 2Ba . . . internal space of second housing 2B, 12Bc . . . inlet of second refrigerant channel 12B, 2Bd . . . stepped portion of second housing 2B, 3 . . . stator, 3*a* . . . stator core, 4 . . . rotor, 4*a* . . . rotor core, 5 . . . rotary shaft, 7 (7A, 7B) . . . coil (coil end), 8 . . . magnet, 10 (10A, 10B) . . . refrigerant supply channel, 11 . . . first refrigerant channel, 12 (12A, 12B) . . . second refrigerant channel, 13 (13A, 13B) . . . third refrigerant channel, 14A, 14B . . . communication path, 15A . . . first refrigerant discharge channel, 15B . . . second refrigerant discharge channel

The invention claimed is:

1. A rotating electric machine comprising:

a stator having an annular stator core and a coil wound around the stator core;

a rotor that is disposed on an inner peripheral side of the stator and that includes a rotary shaft, a rotor core to which the rotary shaft is fixed, and a magnet fixed to the rotor core; and a refrigerant channel through which refrigerant for cooling the stator flows, wherein the refrigerant channel has:

a first refrigerant channel through which the refrigerant flows along a circumferential direction surrounding the rotary shaft;

a second refrigerant channel which communicates with the first refrigerant channel, and through which the refrigerant flows along an axial direction of the rotary shaft;

a third refrigerant channel which communicates with the second refrigerant channel, and through which the refrigerant flows along the circumferential direction surrounding the rotary shaft; and a refrigerant supply channel that supplies the refrigerant to the first refrigerant channel first among the first refrigerant channel, the second refrigerant channel, and the third refrigerant channel, the third refrigerant channels are provided at both ends of the stator core in the axial direction, the first refrigerant channel is provided between the two third refrigerant channels respectively provided at both ends of the stator core in the axial direction, the second refrigerant channel has one second refrigerant channel that has one end communicating with the first refrigerant channel and the other end communicating with one of the two third refrigerant channels, and the other second refrigerant channel that has one end communicating with the first refrigerant channel and the other end communicating with the other of the two third refrigerant channels, and the first refrigerant channel, the second refrigerant channel, and the third refrigerant channel are configured so that the refrigerant supplied to the first refrigerant channel flows from the one second refrigerant channel to the one third refrigerant channel, and the refrigerant supplied to the first refrigerant channel flows from the other second refrigerant channel to the other third refrigerant channel.

2. The rotating electric machine according to claim 1, further comprising a housing for the stator and the rotor, wherein at least one of the first refrigerant channel, the second refrigerant channel, or the third refrigerant channel has a groove-shaped portion formed on an outer peripheral surface of the stator core, the groove-shaped portion being covered with an inner peripheral surface of the housing.

3. The rotating electric machine according to claim 2, wherein the second refrigerant channel has the groove-shaped portion formed on the outer peripheral surface of the stator core, the groove-shaped portion being covered with the inner peripheral surface of the housing, and a plurality of the one second refrigerant channels and a plurality of the other second refrigerant channels are provided circumferentially on the outer peripheral surface of the stator core.

4. The rotating electric machine according to claim 3, wherein an inlet of the one second refrigerant channel communicating with the first refrigerant channel and an inlet of the other second refrigerant channel communicating with the first refrigerant channel open in the outer peripheral surface of the stator core so as to face outward in a radial direction.

5. The rotating electric machine according to claim 4, wherein the groove-shaped portion of the one second refrigerant channel and the groove-shaped portion of the other second refrigerant channel are a continuous straight groove-shaped portion.

6. The rotating electric machine according to claim 5, wherein the one third refrigerant channel is provided axially inwardly from one end of the stator core in the axial direction, the other third refrigerant channel is provided axially inwardly from the other end of the stator core in the axial direction, and the first refrigerant channel, the one third refrigerant channel, and the other third refrigerant channel have the groove-shaped portions formed on the inner peripheral surface of the housing, and the groove-shaped portions formed on the inner peripheral surface of the housing is covered with the outer peripheral surface of the stator core.

7. The rotating electric machine according to claim 6, wherein the housing has a first housing disposed on the one end side of the stator core in the axial direction and a second housing disposed on the other end side of the stator core, the first housing has a stepped portion that abuts on one end face of the stator core, the second housing has a stepped portion that abuts on the other end face of the stator core, an end of the groove-shaped portion of the one second refrigerant channel opposite to the first refrigerant channel is closed by the stepped portion of the first housing, and an end of the groove-shaped portion of the other second refrigerant channel opposite to the first refrigerant channel is closed by the stepped portion of the second housing.

8. The rotating electric machine according to claim 6, wherein the first refrigerant channel, the second refrigerant channel, and the third refrigerant channel have channel cross-sectional areas having the following relationship:

cross-sectional area of single second refrigerant channel<cross-sectional area of single third refrigerant channel<cross-sectional area of single first refrigerant channel.

9. The rotating electric machine according to claim 7, further comprising:

one communication path that has one end communicating with the one third refrigerant channel and the other end communicating with an internal space of the housing in which a coil end portion configured on one end face side of the stator core is disposed; and the other communication path that has one end communicating with the other third refrigerant channel and the other end communicating with the internal space of the housing in which a coil end portion configured on the other end face side of the stator core is disposed, wherein the one communication path and the other communication path are provided above an uppermost portion of the coil end portions, the first housing has a first refrigerant discharge channel that discharges the refrigerant dripped onto the coil end portion on the one end face side of the stator core to an outside of the first housing, and the second housing has a second refrigerant discharge channel that discharges the refrigerant dripped onto the coil end portion on the other end face side of the stator core to an outside of the second housing.

10. The rotating electric machine according to claim 9, wherein the refrigerant supplied to the first refrigerant channel is divided into the plurality of one second refrigerant channels and the plurality of other second refrigerant channels while flowing circumferentially in contact with the outer peripheral surface of the stator core, the refrigerant divided into the plurality of one second refrigerant channels flows upward in the one third refrigerant channel while merging in the one third refrigerant channel, and reaches the one communication path, and the refrigerant divided into the plurality of other second refrigerant channels flows upward in the other third refrigerant channel while merging in the other third refrigerant channel, and reaches the other communication path.

* * * * *